United States Patent [19]

Salomon et al.

[11] Patent Number: 5,070,773
[45] Date of Patent: Dec. 10, 1991

[54] COFFEE OR TEA MAKER

[75] Inventors: Thomas Salomon, Schloss Holte; Hans-Jürgen Slomka, Minden, both of Fed. Rep. of Germany

[73] Assignee: Melitta-Werke Bentz & Sohn, Minden, Fed. Rep. of Germany

[21] Appl. No.: 518,444

[22] Filed: May 3, 1990

[30] Foreign Application Priority Data

May 3, 1989 [DE] Fed. Rep. of Germany ....... 3914605
Feb. 9, 1990 [DE] Fed. Rep. of Germany ....... 4003916

[51] Int. Cl.⁵ .............................................. A23F 3/00
[52] U.S. Cl. ........................................ 99/307; 99/295
[58] Field of Search ................. 141/309, 310, 285, 15; 99/295, 299, 300, 302 R, 304, 305, 306, 307, 311, 312, 314, 315

[56] References Cited

U.S. PATENT DOCUMENTS

| | | | |
|---|---|---|---|
| 1,957,163 | 5/1934 | Falla | 99/304 |
| 2,857,084 | 10/1958 | Harris | 99/309 |
| 3,626,839 | 12/1971 | Martin | 99/315 |
| 3,859,902 | 1/1975 | Neumann | 99/304 |
| 4,402,257 | 9/1983 | Marotta | 99/295 |
| 4,448,113 | 5/1984 | Brabon | 99/290 |
| 4,784,051 | 11/1988 | Häuslein | . |
| 4,819,553 | 4/1989 | Heyn | 99/305 |

FOREIGN PATENT DOCUMENTS

| | | | |
|---|---|---|---|
| 149841 | 2/1953 | Australia | 141/286 |
| 159586 | 11/1954 | Australia | 141/285 |
| 2151636 | 5/1972 | Fed. Rep. of Germany | 99/295 |
| 2741719 | 3/1979 | Fed. Rep. of Germany | 99/300 |

Primary Examiner—Harvey C. Hornsby
Assistant Examiner—Terrence R. Till
Attorney, Agent, or Firm—Spencer & Frank

[57] ABSTRACT

Coffee or tea maker has an intermediate vessel for holding heated water, a siphon for periodically emptying the intermediate vessel into a coffee or tea filter, a ventilation pipe for venting the intermediate vessel, and a water inlet for filling said intermediate vessel with heated water. The intermediate vessel is closed except for the siphon, the ventilation pipe, and the inlet pipe. There is a siphon inlet on an upper part of the siphon and which extends upwardly further than a lower delimiting plane on a lower portion of a downwardly open chamber located within the intermediate vessel. The ventilation pipe opens into the downwardly open chamber for venting air therefrom, and the lower delimiting plane lies below the overflow edge of the siphon inlet for preventing air from entering the downwardly open chamber when the water level in the intermediate vessel is at least at the level of the lower delimiting plane for preventing further venting of air from the intermediate vessel for enhancing siphoning by the siphon.

11 Claims, 4 Drawing Sheets

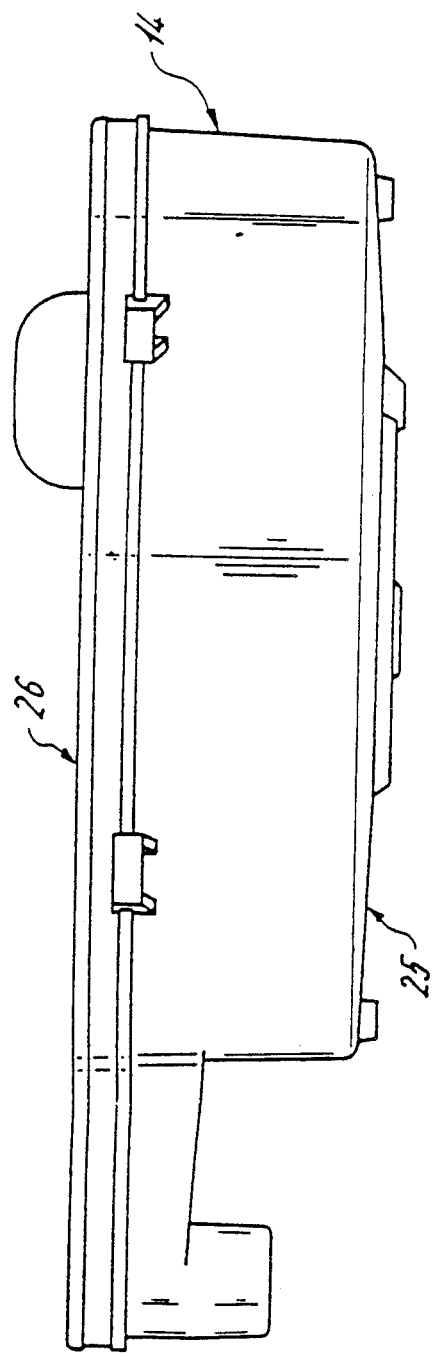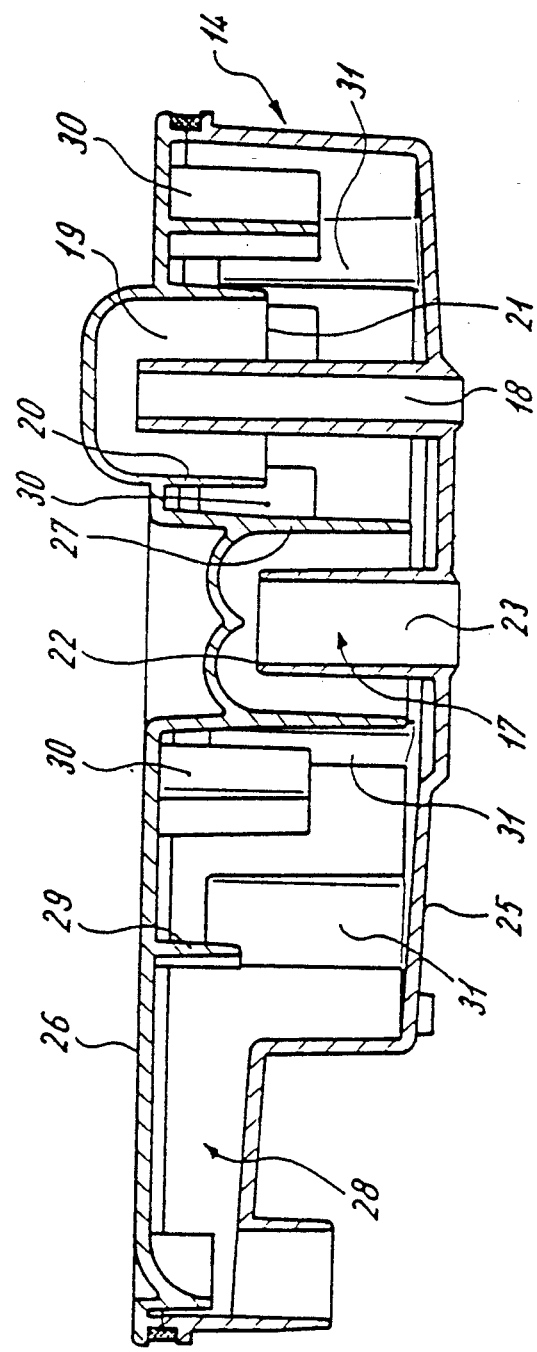

5,070,773

COFFEE OR TEA MAKER

CROSS-REFERENCE TO RELATED APPLICATION

This application claims the priority of Federal Republic of Germany applications P 39 14 605.7 filed May 3rd, 1989 and P 40 03 916 filed Feb. 9th, 1990, which are incorporated herein by reference.

BACKGROUND OF THE INVENTION

The present invention relates to a coffee or tea maker including an intermediate vessel for the brewing water. The intermediate vessel has an outlet siphon for periodic emptying, and is provided with a ventilation pipe, while otherwise being completely enclosed except for a water inlet.

German Offenlegungsschrift 36 43 878 (published unexamined application), a counterpart to U.S. Pat. No. 4,784,051, discloses a coffee or tea maker of this type.

The intermediate vessel, which can be periodically emptied by means of a siphon, serves to initially collect a predetermined quantity of heated brewing water and to convey the water relatively rapidly into the filter vessel positioned below the intermediate vessel.

The ventilation pipe serves to remove the air from the intermediate vessel, which is completely sealed except for the water inlet, and thus to allow it to be reliably emptied.

If during a final interval of the brewing stage the intermediate vessel is filled only partially with brewing water, the steam following the water nevertheless causes the intermediate vessel to be emptied. This emptying phenomenon arises, given that with the appropriate cross-sectional configuration of the ventilation pipe, the resulting pressure in the intermediate vessel ensures that the brewing water is able to flow over the overflow edge of the siphon even if the vessel is filled only partially.

Although the basic concept of such coffee or tea makers is certainly operational, difficulties arise in the accurate matching of all components of the intermediate vessel for maintaining the efficiency of the siphon under all operating conditions.

SUMMARY OF THE INVENTION

It is an object of the present invention to provide a coffee or tea maker of the above-outlined type in which the operational reliability of the siphoning function of the intermediate vessel is improved.

This object is accomplished according to the invention in that the ventilation pipe opens into a downwardly open chamber defined by walls in the interior of the intermediate vessel, and that the lower delimiting plane of the downwardly open chamber lies below the overflow edge of the siphon.

This measure has the result that, beginning with the moment at which the water level in the intermediate vessel reaches the lower delimiting plane of the chamber, air can no longer be removed from the intermediate vessel.

Further transfer of brewing water into the intermediate vessel, which is concomitant with the transfer of steam bubbles into the intermediate vessel, develops increased pressure in the intermediate vessel that pushes the brewing water disposed in the intermediate vessel relatively suddenly over the overflow edge of the siphon. The siphon outlet is instantly filled with a closed column of water so that a break in the inflowing water and thus inoperability of the siphon is reliably avoided.

In one particularly suitable embodiment of the invention the ventilation pipe has a plurality of very small ventilation bores.

This embodiment ensures that a sufficiently large cross-sectional area is available for ventilation. If, during the last brewing interval, the intermediate vessel is filled only partially with brewing water, the inflowing steam meets an increased flow resistance so that in such a case a quick and effective increase in pressure is realized in the intermediate vessel. This embodiment takes advantage of the fact that the flow resistance of a large number of comparatively small ventilation bores considerably increases as a function of the flow velocities as compared with that of a single ventilation bore having approximately the same cross-sectional area.

BRIEF DESCRIPTION OF THE DRAWINGS

FIG. 3 is a side elevational view of yet a further preferred embodiment of the invention.

FIG. 4 is a sectional side elevational view of the structure of FIG. 3.

DETAILED DESCRIPTION OF THE PREFERRED EMBODIMENTS

Figure 1:
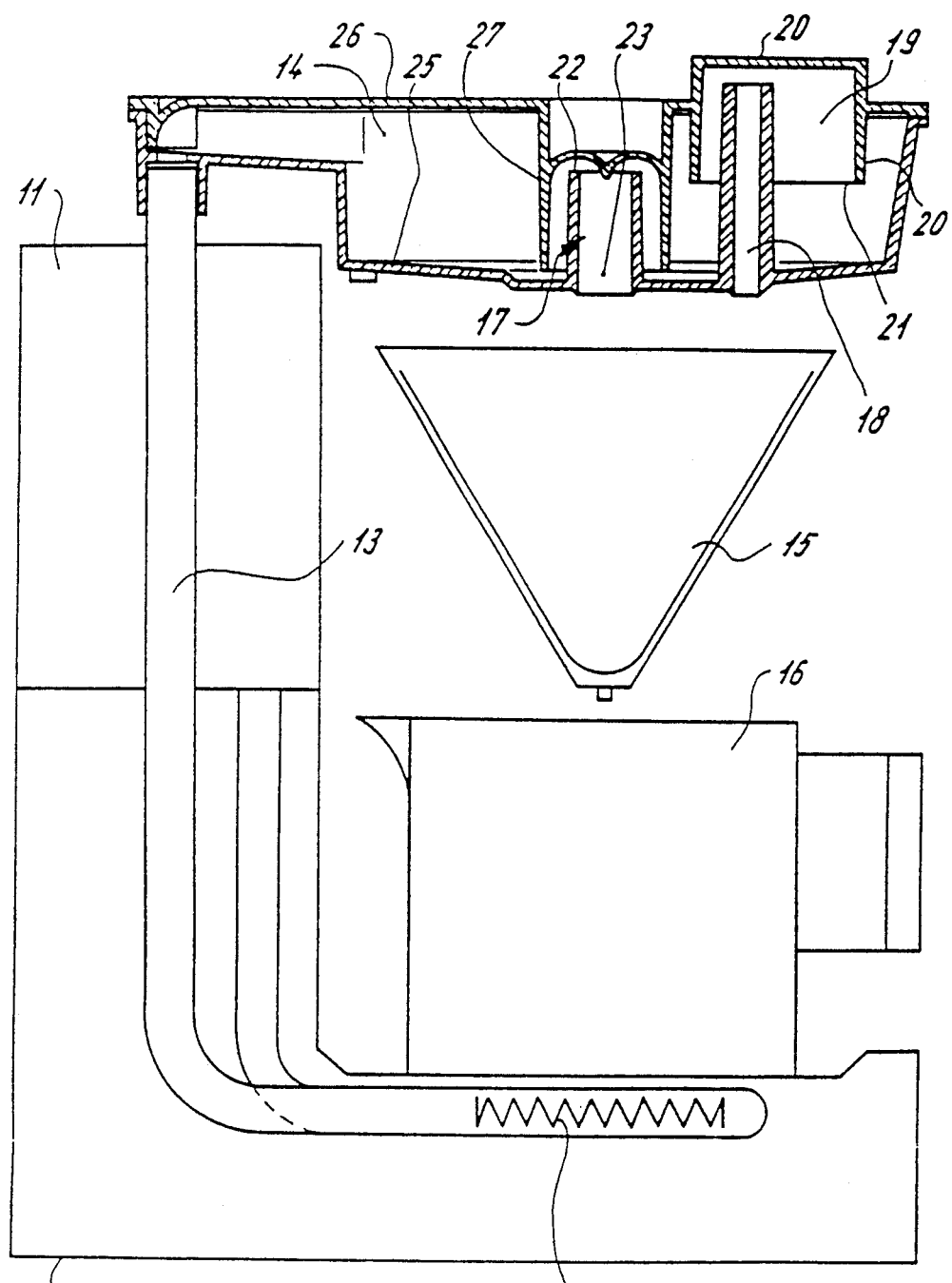
FIG. 1 is a schematic sectional side elevational view of a coffee or tea maker incorporating a preferred embodiment of the invention.

The coffee or tea maker 10 of the present invention shown in FIG. 1 includes a fresh water vessel 11, a flowthrough heater 12, a riser pipe 13, and an intermediate vessel 14 into which riser pipe 13 opens. Below intermediate vessel 14, which will be described in greater detail below, there is a filter vessel 15, and below filter vessel 15 there is a receiving vessel 16 to collect aromatic extracts of coffee or tea.

Intermediate vessel 14 has a siphon 17 and is periodically emptied by way of this siphon 17. Intermediate vessel 14 also has a ventilation pipe 18 and is otherwise completely enclosed except for the water inlet, that is, the transition region between riser pipe 13 and intermediate vessel 14.

As shown in FIG. 1, ventilation pipe 18 opens into a chamber 19 disposed outside of the region of siphon 17 and defined by walls 20. Chamber 19 is open only toward its bottom side. Moreover, a lower delimiting plane 21 of chamber 19 lies below the overflow edge 22 of siphon 17. This means that if the water in intermediate vessel 14 reaches a level up to the height of lower delimiting plane 21 of chamber 19, it is possible to remove air from intermediate vessel 14; if this water level is exceeded, however, no further removal of air takes place as now chamber 19 is closed off from the remaining interior of intermediate vessel 14. Accordingly, if more water is conveyed into intermediate vessel 14, which is concomitant with the entrance of steam into intermediate vessel 14, a rise in pressure will occur very quickly resulting in the water stored in intermediate vessel 14 being forced into siphon 17. This occurs relatively suddenly, that is, siphon outlet 23 is immediately completely filled with water so that the danger of the inflowing stream of water breaking off is no longer present, and the efficiency of siphon 17 as a whole is improved.

Figure 2:
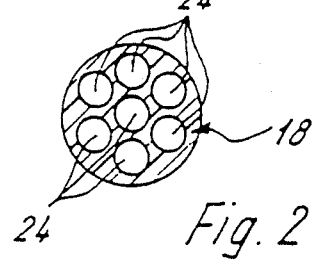
FIG. 2 is a cross-sectional view of a ventilation pipe according to a further preferred embodiment of the invention.

FIG. 2 shows that ventilation pipe 18 of intermediate vessel 14 may also be provided with a plurality of very small ventilation bores 24. Such ventilation bores afford the advantage that, although a larger cross-sectional area is provided for the discharge of air in the required air removal process, the increase in pressure in the interior of intermediate vessel 14 if steam enters into the intermediate vessel, particularly during a final brewing step, occurs extremely quickly as the velocity of the inflowing stream is considerably higher than the flow velocity of the air removed from intermediate vessel 14. This is so, because the flow resistance of the small ventilation bores 24 increases considerably as a function of the flow velocities as compared to a single ventilation bore having approximately the same cross-sectional area.

Advantageously, as shown in FIG. 1, intermediate vessel 14 as a whole is manufactured of merely two components; namely, a lower vessel component 25 and a cover 26. Lower vessel component 25 and cover 26 are preferably made of plastic and are welded or glued to one another. Siphon outlet 23 and ventilation pipe 18 are integrally formed with the lower vessel component 25. Likewise, walls 20 of chamber 19 and the extraction or suction cone 27 of siphon 17 are integral with cover 26. Thus, intermediate vessel 14 and its operational components, such as siphon 17, ventilation pipe 18, and chamber 19, can be manufactured extremely economically and easily. At the same time, the operation of siphon 17 is improved by the described measures, particularly also with respect to the emptying of residual quantities of water which may develop during a final brewing cycle.

Figure 5:
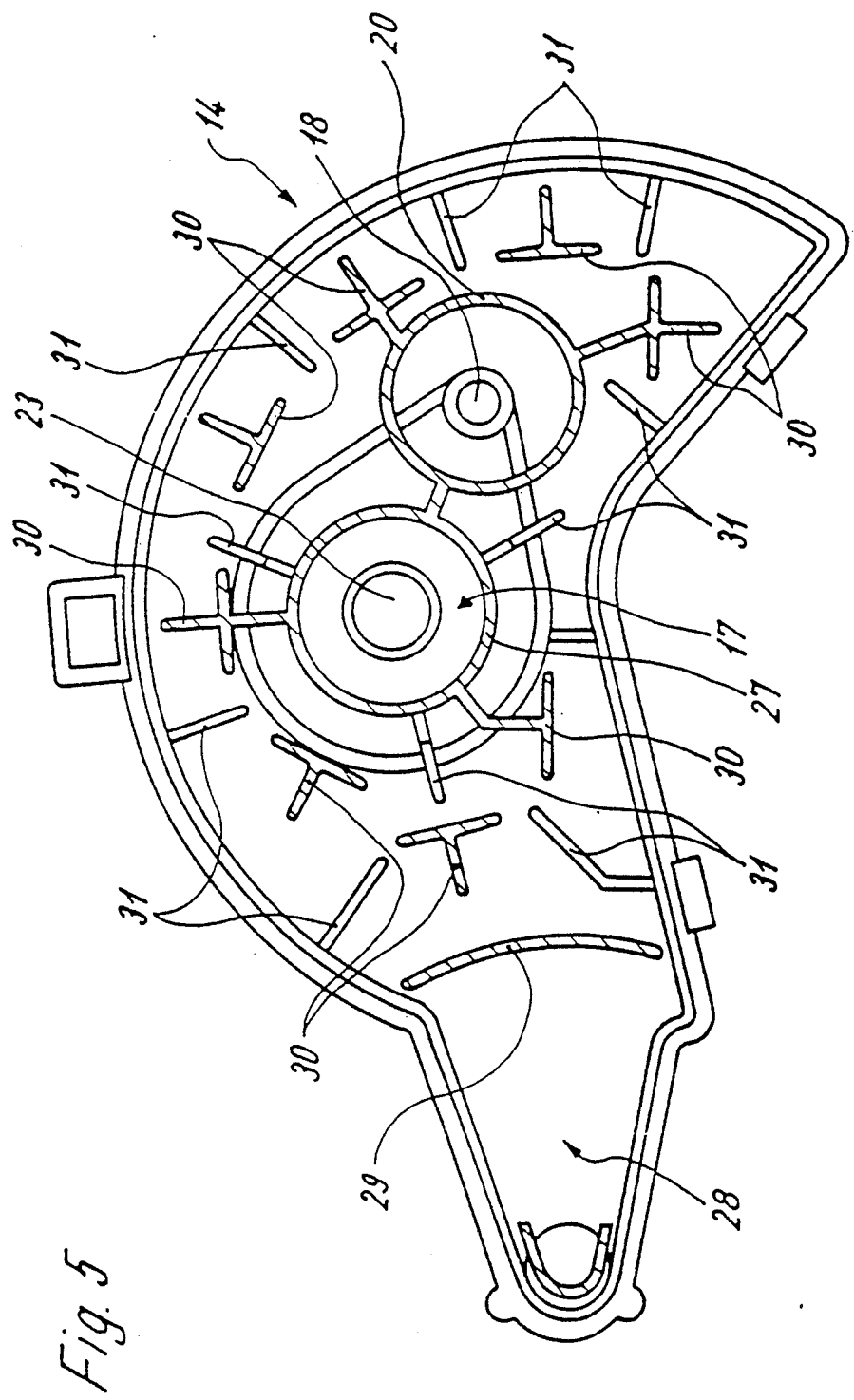
FIG. 5 is a sectional plan view of the intermediate vessel of FIG. 3.

The further embodiment of intermediate vessel 14 shown in FIGS. 3 to 5 has basically the same structure as the intermediate vessel 14 of FIG. 1. Accordingly, like reference numerals have been used for like components. The embodiment of FIG. 3 differs from the embodiment of FIG. 1, for example, owing to the intermediate vessel 14 having, in the transition region between fresh water inlet 28 and the actual water collecting chamber, a downwardly projecting baffle web 29 which is integrally attached to cover 26. Baffle web 29 produces a relatively undisturbed flow of the brewing water into the collecting chamber of intermediate vessel 14. It is known that flowthrough heaters of coffee or tea makers tend to produce intermittent water flow so that generally the influx of brewing water into intermediate vessel 14 is discontinuous and produces undulations in the brewing water. These undulations are counteracted by the baffle web 29 in the transition region between water inlet 28 and the collection chamber.

The water in the collection chamber of intermediate vessel 14 is further protected against disturbances by a plurality of calming webs 30 and 31, respectively, which are alternatingly attached to cover 26 and lower vessel member 25, and which extend into the interior of collecting vessel 14. The calming webs 30 shaped to cover 26 extend considerably farther into the interior of intermediate vessel 14 than the walls 20 defining chamber 19. However, in height, the calming webs 31 attached to lower vessel member 25 extend upwardly considerably beyond lower delimiting plane 21 of chamber 19. Calming webs 30 and 31 integral with cover 26 and lower vessel member 25, respectively, as a whole are arranged in such a manner that they practically completely calm down and compensate for the undulations caused by the discontinuous flow of the water so that the desired sealing of chamber 19 is ensured if the water level rises up to the lower delimiting plane 21 even if the brewing water flows into intermediate vessel 14 in a very disturbed manner. Thus, the function of this seal in chamber 19, which achieves the desired increase in pressure by preventing the escape of air, is ensured even if the water flows through the flow-through heater in a very irregular manner. This is further facilitated by the fact that chamber 19, into which ventilation pipe 18 opens, is disposed in a region of intermediate vessel 14 remote from water inlet 28.

As shown in FIG. 5, calming webs 30 attached to cover 26 have a T-shaped profile while calming webs 31 attached to lower vessel component 25 are simple flat webs. The arrangement of calming webs 30 and 31 as a whole produces a labyrinth which results in optimum calming of the inflowing brewing water.

Figure 6:
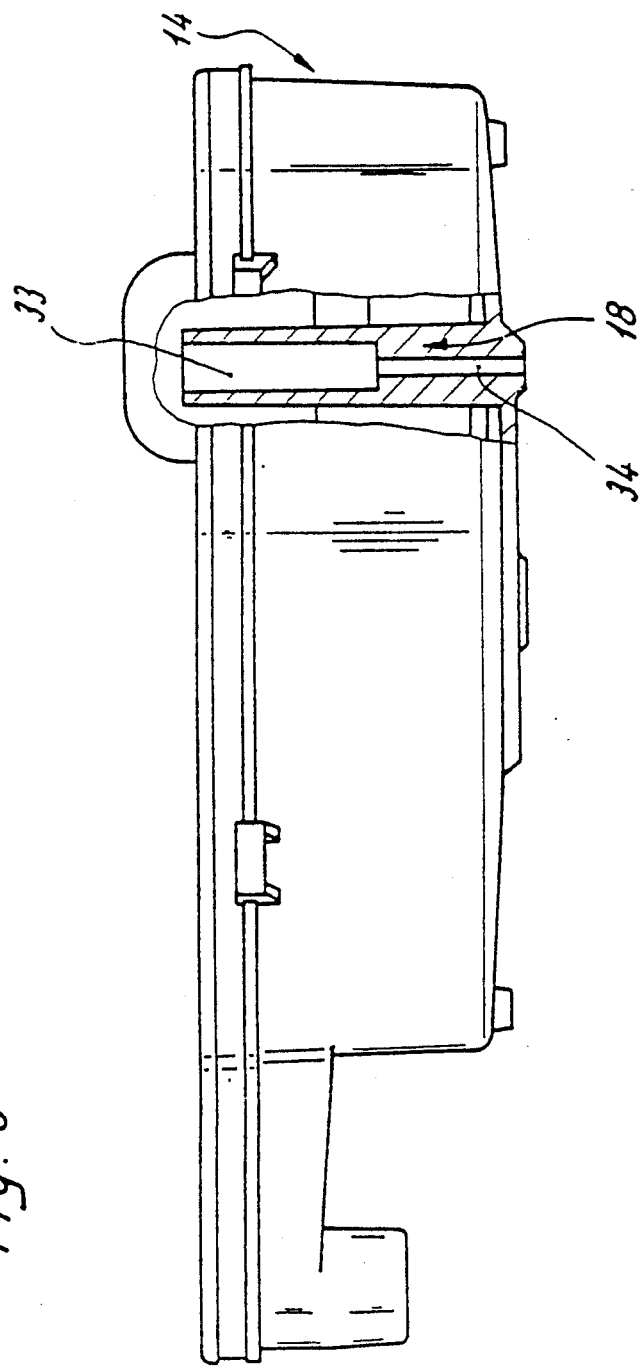
FIG. 6 is a partial sectional side elevational view of a further preferred embodiment of the invention.

FIG. 6 shows a further embodiment of intermediate vessel 14 of the invention for a coffee or tea maker in which ventilation pipe 18 has a stepped bore having an upper and lower bore section 31 and 34, respectively. The bore section 33 which opens directly into intermediate vessel 14 has a larger diameter than the bore section 34 leading out of intermediate vessel 14. From a fluid flow technology stand point, this stepped bore acts like a baffle. If steam enters into intermediate vessel 14, particularly during a final interval of the brewing stage, the relatively high flow velocity of the steam produces turbulence in the transition region between the two different size bore sections 33 and 34 that results in an apparent cross-sectional constriction of bore section 34, which in any case has a smaller diameter, so that again a rapid pressure increase is developed in the interior of intermediate vessel 14.

It will be understood that the above description of the present invention is susceptible to various modifications, changes and adaptations, and the same are intended to be comprehended within the meaning and range of equivalents of the appended claims.

I claim:

1. In a coffee or tea maker including an intermediate vessel for holding heated water, a siphon extending within said vessel and having an outlet passing through a bottom of said vessel for periodically emptying said intermediate vessel into a coffee or tea filter, a ventilation pipe for venting said intermediate vessel, a water inlet for filling said intermediate vessel with heated water, and said intermediate vessel being closed except for said siphon, said ventilation pipe, and said inlet, wherein the improvement comprises:

means defining an overflow edge of a siphon inlet on an upper part of said siphon within said vessel;

means defining a downwardly open chamber disposed in the interior of said intermediate vessel;

means defining a lower delimiting plane on a lower portion of said downwardly open chamber;

said ventilation pipe opening into said downwardly open chamber for venting air therefrom; and said means defining the lower delimiting plane lying below said overflow edge of said siphon inlet for preventing air from entering said downwardly open chamber when a water level in said intermediate vessel is at least at the level of said means defining the lower delimiting plane for preventing further venting of air from said intermediate vessel through said ventilation pipe while siphoning heated water is started to insure continuous outflow of heated water.

2. A coffee or tea maker as recited in claim 1, wherein said ventilation pipe includes a plurality of ventilation bores for venting air.

3. A coffee or tea maker as recited in claim 1, wherein said ventilation pipe includes a stepped bore having an upper bore section and a lower bore section, said upper bore section opening into said intermediate vessel, said lower bore section opening to the exterior of said intermediate vessel, and said upper bore section having a larger diameter than said lower bore section.

4. A coffee or tea maker as recited in claim 1, wherein said intermediate vessel comprises a one-piece lower vessel member and a one-piece cover, said siphon and said ventilation pipe are integrally attached to said lower vessel member, and further comprising a suction cone disposed over said inlet of said siphon and attached to the cover.

5. A coffee or tea maker as recited in claim 4, wherein said lower vessel member and said cover are plastic.

6. A coffee or tea maker as recited in claim 5, wherein said lower vessel member and said cover are joined together by a glue or a weld.

7. A coffee or tea maker as recited in claim 4, further comprising a water collection chamber in said intermediate vessel and a downwardly extending baffle web attached to said cover, and said baffle web is disposed in a transition region between said water inlet and said water collection chamber of said intermediate vessel.

8. A coffee or tea maker as recited claim 7, further comprising a plurality of vertical calming webs attached to one of said lower vessel member and said cover in the region of said water collection chamber of said intermediate vessel, said calming webs extending beyond said lower delimiting plane.

9. A coffee or tea maker as recited in claim 8, wherein said plurality of calming webs have a T-shaped cross section.

10. A coffee or tea maker as recited in claim 8, wherein said plurality of calming webs comprise substantially flat webs.

11. A coffee or tea maker as recited in claim 1, wherein said ventilation pipe and said downwardly opening chamber are disposed in a region of said intermediate vessel remote from said water inlet.

* * * * *